US00RE37430B1

(19) United States
(12) Reissued Patent
Toon

(10) Patent Number: US RE37,430 E
(45) Date of Reissued Patent: Oct. 30, 2001

(54) STAINLESS STEEL YARN AND PROTECTIVE FABRIC

(75) Inventor: John J. Toon, South Daytona, FL (US)

(73) Assignee: USF Filtration and Separations Group, Timonium, MD (US)

(21) Appl. No.: 08/534,343

(22) Filed: Sep. 27, 1995

Related U.S. Patent Documents

Reissue of:
(64) Patent No.: 5,248,548
Issued: Sep. 28, 1993
Appl. No.: 07/796,386
Filed: Nov. 22, 1991

(51) Int. Cl.[7] ..... D02G 3/18; D02G 3/38
(52) U.S. Cl. ..... 428/377; 428/224; 428/229; 428/296; 428/297; 428/357; 428/373; 428/377; 428/392; 428/401
(58) Field of Search ..... 428/224, 229, 428/297, 303, 296, 357, 373, 377, 392, 401; 57/210

(56) References Cited

U.S. PATENT DOCUMENTS

| | | |
|---|---|---|
| 3,883,898 | 5/1975 | Byrnes . |
| 4,004,295 | 1/1977 | Byrnes . |
| 4,384,449 | 5/1983 | Byrnes . |
| 4,470,251 | 9/1984 | Bettcher . |
| 4,777,789 | 10/1988 | Kolmes . |
| 4,838,017 | 6/1989 | Kolmes . |
| 4,912,781 | 4/1990 | Robins . |
| 5,070,540 | 12/1991 | Bettcher et al. . |
| 5,119,512 | 6/1992 | Dunbar et al. . |
| 5,248,548 | 9/1993 | Toon . |
| 5,287,690 | 2/1994 | Toon . |

FOREIGN PATENT DOCUMENTS

| | | |
|---|---|---|
| 2668176 | 4/1992 | (FR) . |

*Primary Examiner*—Richard Weosberger
(74) *Attorney, Agent, or Firm*—Frijouf, Rost & Pyle, P.A.

(57) ABSTRACT

Cut resistant, abrasion resistant and electrically conductive yarns (1) are formed in torque-free form from stainless steel and other metallic yarns (2) served with or formed into composite twists with non-metallic yarns and fibers (4) and (5). The metallic yarn (2) is made up of at least about 60 ends, and up to as many as about 300 ends, of metal fibers (3) having a diameter of from about 2 to about 25 $\mu$m. The absence of torque permits facile knitting into protective garments, such as cut resistant, abrasion resistant and/or electrically conductive gloves (10), or yarns which are as much as 85 to 90% by weight metallic fiber. When knit into gloves, added protection may be provided from puncture injuries if the palm (12), finger stalls (14) and thumb stall (16) are coated or impregnated with an elastomer or the like.

17 Claims, 1 Drawing Sheet

STAINLESS STEEL YARN AND PROTECTIVE FABRIC

Matter enclosed in heavy brackets [ ] appears in the original patent but forms no part of this reissue specification; matter printed in italics indicates the additions made by reissue.

BACKGROUND

This invention relates to the technical field of stainless steel cut resistant, abrasion resistant and electrically conductive yarn, suitable for making fabrics and particularly knitting fabrics and garments, and to protective garments, such as cut resistant, abrasion resistant and/or electrically conductive gloves, aprons, smocks, jackets, trousers, leggings, socks or stockings, and the like, as well as protective fabric structures of all kinds, such as drapes and the like.

Cut resistance is important in a wide variety of industries, as lacerations are one of the greatest causes of industrial accidents. Notable are the meat cutting and butchering workers, machinists, carpenters and joiners, assembly line workers, and the like.

Abrasion resistance is comparably important in a variety of industrial contexts; also of significance is the incidence of abrasive exposure among athletes, particularly those performing on artificial turf and other harsh environments.

Electrical conductivity is a major asset in electronics industries, where grounding to dissipate static discharge is necessary to prevent damage to electronic components and assemblies.

A number of approaches have been followed to provide cut resistant, abrasion resistant and electrically conductive yarns, and for forming such yarns into fabrics and protective garments and the like.

Numerous attempts have been made to employ metallic yarns and wires. Wires are generally prohibitively difficult to work with, and are prone to breakage when worked and work hardened. Metallic wires are not particularly durable when exposed to abrasion, and numerous breaks occur during spinning, knitting, and in use.

High strength polymers have been substituted for metallic wires and yarns; among these are the aromatic polyamides, such as Kevlar®, and ultra-high molecular weight polyolefins, such as Spectra® (Kevlar® is a registered trademarks of du Pont. Spectra® is a registered trademark of Allied Signal, Inc.) While these materials have met with some success, the level of cut resistance attained, and the bulk of fibers and yarns required, remain problems for users.

U.S. Pat. No. 3,883,898, Byrnes, teaches the employment of Kevlar® yarns in providing cut resistant garments.

More recently, composite metallic-polymer yarns have been employed. Such composites afford overall better properties, but the limitations of both metallic and synthetic polymers are still present to some degree.

U.S. Pat. No. 4,004,295, Byrnes, teaches a composite yarn of metallic wire and a Kevlar® yarn in providing cut resistant garments.

U.S. Pat. No. 4,384,449, Byrnes, et al., teaches a composite yarn having a core of one or more strands of metal wire, served with two plies of Kevlar® fiber wrapped in opposite directions.

U.S. Pat. No. 4,470,251, Betticher, teaches a composite yarn having a core of one or more strands of metal wire, served with two plies, the first of Kevlar® fiber wrapped in one direction, the second of Nylon® polyamide wrapped in the opposite direction.

U.S. Pat. No. 4,777,789, Kolmes, et al., teach a composite having a polymer core, of a variety of natural and synthetic fibers, a wrapping of wire, and a serving over the wire wrapping of two counter wound plies of non-metallic fibers. U.S. Pat. No. 4,838,107 is a Continuation, having the same disclosure.

U.S. Pat. No. 4,912,781 is a composite yarn with a polymer fiber core having a metallic wire knit over the core; the composite thus formed may be served, braided or over-knit with a synthetic polymer fiber outer cover.

Wire and wire cored metallic yarns are quite difficult to knit or otherwise fabricate into protective garments.

The garments are generally bulky, stiff and heavy. In the form of gloves, limited flexibility and tactility constrain the functionality of the gloves.

Efforts to reduce the diameter of metallic wire cores in multiple strands result in the development of excessive torque and liveliness which limits the ability to knit gloves or other protective garments. In workable yarns with limited metallic content, cut resistance is often inadequate.

Wire cored yarns are prone to breakage when knit, flexed, bent, or otherwise manipulated, compromising the protective value and properties for which it is employed.

OBJECTS AND SUMMARY

It is an object of the present invention to provide metallic yarns with high levels of cut resistance and electrical conductivity in a form substantially free of torque or liveliness, easily knitted or otherwise formed into fabrics and protective garments and the like, particularly gloves.

In the present invention, a cut resistant, abrasion resistant, electrically conductive composite yarn for making protective garments and the like is provided, comprising a core and a serving or wrapping applied on the core, wherein the core is a substantially torque-free continuous filament metallic yarn of at least about 60 ends, and up to as much as about 300 ends, each fiber in said metallic yarn has a diameter of not more than about 25 $\mu$m, and the serving comprises at least one non-metallic fiber.

In another aspect of the present invention, a cut resistant, abrasion resistant, electrically conductive, low torque composite yarn for making protective garments and the like is provided comprising a composite twist of a metallic yarn and at least one non-metallic yarn, wherein the first metallic yarn is a continuous filament metallic yarn of at least about 60–300 ends, preferably about 80–100 ends, having a twist in a direction opposite to the twist of the composite twist, and each fiber in the metallic yarn has a diameter of not more than about 25 $\mu$m.

The cut resistant and electrical conductivity are high, so that the composite yarn may be thinner and lighter weight than the prior art forms. The low torque characteristics make the yarns readily formed into fabrics and protective garments and the like by knitting, weaving and the like.

In the most usual circumstances, polyamides, such as nylon fibers and yarns are preferred for their economy, ready availability, ease of use, and good abrasion resistance. High strength polymers are preferred in other circumstances as the non-metallic yarns; among these are the aromatic polyamides, such as Kevlar®, and ultra-high molecular weight polyolefins, such as Spectra®. These materials add to the cut and abrasion resistance of the composite yarns of the invention, in cooperation with the metal fiber yarns, but at added cost and handling difficulty.

In gloves, in particular, thinner, lighter, and more flexible knits provide gloves with excellent flexibility, tactile properties, and comfort at very high levels of cut resistance and electrical conductivity.

Protective garments and the like, such as gloves can be readily cleaned, by washing and/or dry cleaning techniques, and may be sterilized if required, by the use of cold sterilizing solutions, autoclaving, or the like.

The yarns of the present invention are quite resistant to breakage and the loss of fragments of the metallic fibers during processing or use.

SUMMARY DESCRIPTION OF THE DRAWING

DETAILED DESCRIPTION

Figure 1:
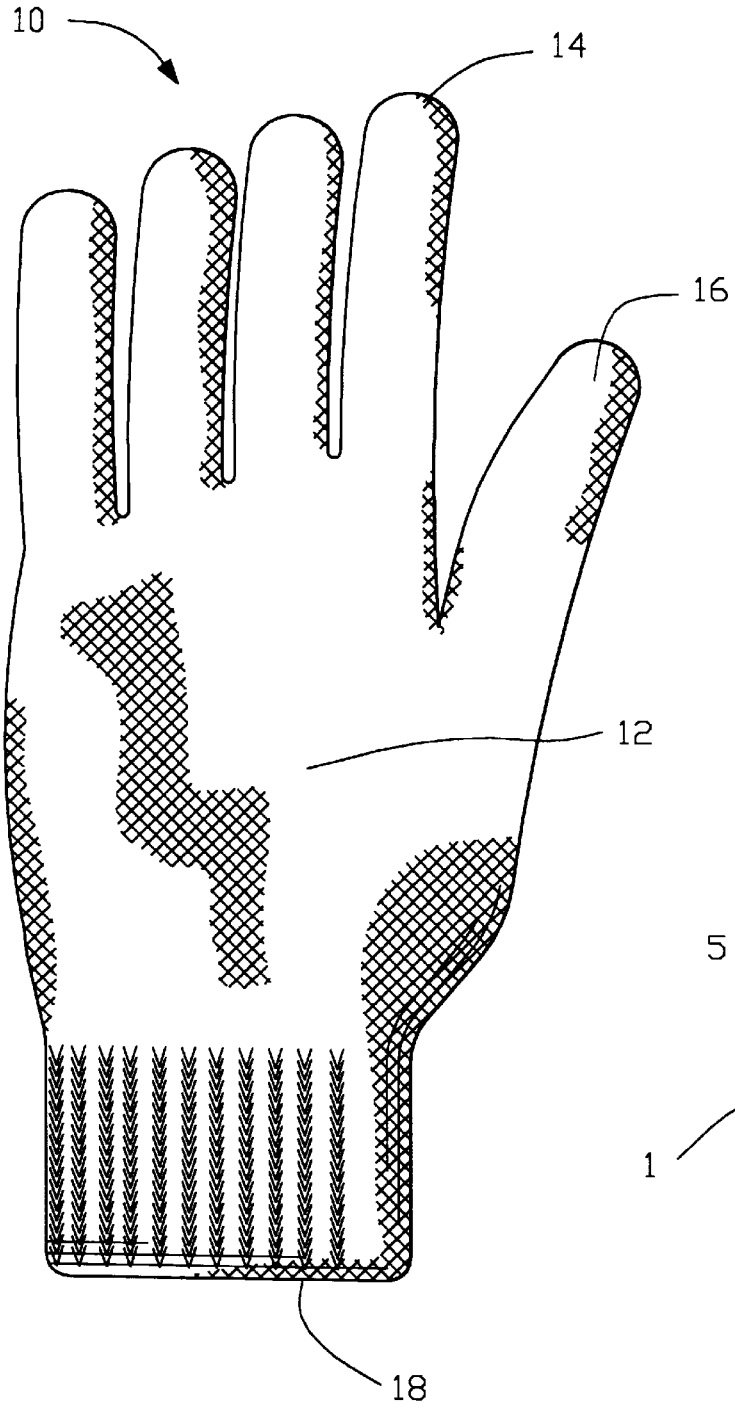
FIG. 1 is a schematic representation of a knit glove of the present invention.
Figure 2:
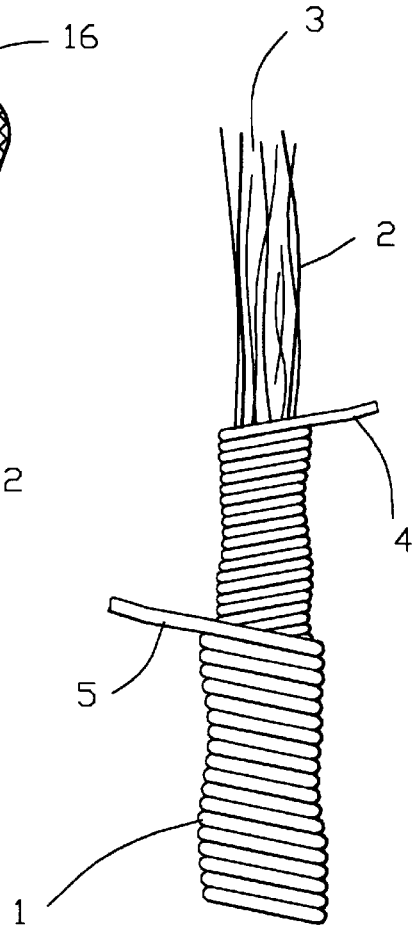
FIG. 2 is a stylized representation of a composite yarn of the present invention.

When metallic wires or yarns are twisted, the imparted torque results in sufficient elastic memory that the yarn will exhibit a tendency to coil or twist when permitted. Such a yarn is frequently said to be "lively" or to exhibit high torque. A yarn free of torque is often said to be "dead". A dead or torque free yarn will not form a twist around itself when held in a "U" shaped loop. "Lively" or high torque yarns pose substantial difficulties in fabricating fabrics and garments and the like, often impart distortions to knits and other fabrics formed of such yarns, and are generally undesirable. The present invention provides and employs yarns which are substantially free of torque, or which are "dead" yarns.

Cut resistance of yarns and fabrics is generally considered to be determined by tenacity or tensile strength, by the coefficient of friction, the grain boundary conditions, and for many metals, the temperature history and condition of the alloy, e.g., whether it has been annealed or not, of the individual stainless steel or other metal fibers in the composite yarn, and by the number of fibers and their configuration in a yarn. In addition, cutting force, cutting velocity and cutting edge characteristics and conditions are factors which affect cut resistance. In general terms, quantification of cut resistance is defined by those of ordinary skill in the art by use of the industry standard Betatec™ Tester and its associated test procedures. Betatec is a trademark of Allied Signal, Inc. The machine and test procedures are the basis of a proposed standard for ASTM testing of cut resistance in protective garments.

Abrasion resistance of yarns is dictated by the tendency of the yarn to lose material when subjected to normal abrasive exposures during processing into products and in the usual environment and modes of use. Abrasion resistance in protective garments and the like is related to the protection of the wearer from abrasion, and is independent from the abrasion resistance of the yarn or fabric. There are no specific standards for the quantification of protection of the wearer from abrasion.

Electrical conductivity of a fabric is measured in two fashions, across the web from one surface to the other, and along one dimension of the web of the fabric. In most circumstances of concern to the present invention, it is the latter case that is significant, in the dissipation of electrostatic charges, for example, by grounding of the glove. The electrical conductivity of the yarn is directly related to conductivity of the fabric, and it is the yarn which is most often and reliably quantified, in specific conductivity or, more conveniently, resistance in Ohms per meter. The electrical resistance of the composite yarns in the present invention is desirably less than about 25 Ohms, preferably less than about 5 Ohms, and is frequently less than 1 Ohm.

The metallic yarns and fibers of the present invention are differentiated from metallic wires by the dimensions of the fibers and the number of the fibers in the yarn bundle. In general terms, wires refer to running lengths having a diameter of greater than about 100 $\mu$m. In the prior art discussed above, the number of such wires employed is most often one or a few, i.e., up to about three of four, strands of wire incorporated into the composite yarns. In the present invention, the term fiber, as applied to the metallic fibers, means a running length having a diameter of 25 $\mu$m or less, down to as little as 2 $\mu$m. In most circumstances a diameter of about 12 $\mu$m is preferred.

The metallic yarns employed in the present invention are preferably continuous filament yarns, comprising bundles of running lengths of the metallic fibers, typically of about 90 to 100 ends. The term "ends" is employed as a term of art in the yarn industry, and represents the number of fibers present in any typical cross section of the yarn. In the continuous filament yarns preferred in the present invention, each filament runs substantially the entire running length of the yarn, although occasional breaks may occur. Such yarns preferably have no twist, or only slight twisting, e.g., up to about 10 twists per meter, although up to 100 twists per meter may be employed. The yarns are normally annealed, whether formed with a twist or not. When spun yarn is employed, the number of ends will be about the same, but the fibers are short, staple lengths of typically 2 to 20 cm, held in the yarn configuration by twisting. Because of the short length of the staple fibers, spun yarn does not exhibit torque, if annealed after spinning.

Even when high modulus metallic fibers, of materials such as stainless steel, are employed, annealed fibers at the small diameters employed in the present inventions are quite flexible, alone or combined into a yarn form. They also resist flex and bending stresses quite well and are quite durable.

The metallic yarns may be formed of a variety of stainless steel alloys or other high tensile strength metals exhibiting a high cut resistance. Type 304 stainless steel is preferred. Such metallic yarns are available commercially from MEMTEC AMERICA CORPORATION, in Timonium, Md., and in Deland, Fla.

The non-metallic yarns in the present invention may be, generally, any textile multi-filament or staple fiber yarn desired. These materials are not critical to the invention, and may be selected for convenience or to serve some extrinsic purpose outside the concerns of the present invention. Suitable materials, by way of example and not limitation, include naturally occurring fibers and synthetic polymer fibers exemplified by cotton, wool, polyolefins, polyesters, polyamides, acrylic fibers, cellulosic fibers such as Rayon and related fibers, and the like. Blends may be employed as well.

While the term yarn is employed for the non-metallic material, the term is also used to signify monofilament fibers, although for most purposes, continuous multifilament yarns and spun staple fiber yarns are preferred.

The non-metallic denier (for filament types) may conveniently be in the range of about 40 to 2500 denier, preferably about 50 to 200 denier. Equivalent weights of yarn of spun staple fibers may be employed. The weight and dimensions of the non-metallic yarn are not narrowly significant, and may be selected based on the desired bulk and thickness of the composite yarn desired.

Wrapping and twisting operations employed in textile operations, and relied upon in the present invention are "handed" and may proceed in clockwise (right-handed) or counter-clockwise (left-handed) directions. In the terminology common in the art, it is usual to denominate the two orientations of twisting and wrapping as the "S" direction and the "Z" direction, respectively.

A wrapping may be in an open spiral or in a closed spiral where substantially each lay of the wrapping is in direct contact. A "serving" most often refers to a closed spiral wrapping.

In the preferred form of the present invention, a highly cut resistant yarn is provided by wrapping or serving a multi-filament stainless yarn core with at least one ply of non-metallic yarn, as defined above. If multiple plies are employed, it is greatly preferred that each ply be wrapped or served in the orientation opposite that of the preceding ply.

As those of ordinary skill in the art will readily understand, the wrapping or serving may be conveniently applied by an elastic yarn wrapping machine, although the equipment and techniques employed are not narrowly significant to the present invention, and other techniques and equipment may be employed if more convenient.

In another embodiment of the present invention, a low-torque composite yarn is formed by twisting two or more plies of yarn together to form a multi-ply where at least one ply is a metal fiber yarn and at least one ply is a non-metallic yarn. Such yarns are well known in the art, and may conveniently be formed on a "ring twister" or other convenient equipment in wholly conventional fashion.

What is not conventional, is that in order to avoid a lively yarn, the metallic fiber ply is first given a twist in a first direction opposite to and in a number of twists substantially equivalent to the subsequent multi-ply twisting. The counter-twist initially imparts substantial torque or liveliness to the metallic yarn which is subsequently reduced in the multi-ply composite twisting operation. Preferably the initial twist has the same number of turns as the subsequent multi-ply counter twist; in such a case, the imparted torque is substantially eliminated.

When the multi-ply composite is formed, it may conveniently have from about 1 to 10 twists per cm, preferably about 2 to 3 twists per cm.

It is preferred that the weight of the non-metallic yarn be at least 10%, and preferably at least about 15% of the weight of the metallic yarn in the multi-ply composite, ranging up to as much as 200%. If the amount of the non-metallic component is less than 10 weight % of the blended composite, the metallic yarn may be susceptible to excessive abrasion. On the other hand, if non-metallic component is much more than about 200 weight %, the surface of the yarn will not have sufficient cut and abrasion resistance to avoid excess superficial fraying and deterioration in appearance and in use. Generally, about 10% to about 20%, on a weight basis, is preferred.

The blended composite yarns of the present invention may be formed into fabrics by any desired technique, equipment, and pattern available to the art.

For most purposes, knit fabrics are preferred, and simple knit patterns are generally most convenient and inexpensive to produce. As those of ordinary skill will understand, at least the finger stalls and palm portions of gloves are preferably formed of plain stitches, which afford the thinnest and most flexible structure, as required for the preservation of tactile perceptions for the wearer, while a cuff portion is desirably formed by a ribbed knit stitch pattern. Other stitches may be employed in other areas of the gloves, for ornamental purposes or the like, substantially any stitch pattern may be employed with the composite yarns of the present invention.

One of the major reasons that knits are preferred in the present invention is the intrinsic stretch properties of knit fabrics. Since the composite yarns of the present invention have very low stretch, the fit and comfort of protective garments, and particularly gloves is dependent on the conformability of the knit fabric to the wearer.

Other garments and the like may not require the intrinsic stretch of knits, and the composite yarns may be woven, bonded, needled, or otherwise formed into woven or non-woven fabrics, which can be sewn or adhesively bonded into desired patterns and articles of protective clothing or the like. Such techniques are well known in the art.

As noted, gloves are the most frequently required protective garment, and the present invention is accordingly discussed with particular reference to gloves. As those of ordinary skill in the art will readily understand, discussion in the context of gloves is equally applicable to other protective garments and like forms.

While knitting is particularly preferred, especially for gloves, those of ordinary skill in the art will also understand that other fabrics, including woven and non-woven forms, may also be formed form the yarn within the scope of the present invention, and may be preferred in the fabrication of particular forms of protective garments and the like not as conveniently suited to knitting. Fabrics of the present invention can be fabricated into such protective garments and the like by all the usual and customary techniques and procedures commonly employed in the fabrication of garments, including sewing, adhesive and thermal bonding and the like. Combinations of such techniques may be employed.

The design of protective garments and the like is unremarkable, excepting only that account should be taken that the yarn of the present invention is very low in stretch. Any stretch or "give" required in the articles fabricated of fabrics must be provided by the structure of the fabric, i.e., by the inherent stretch of knit fabrics or the bias stretch of woven fabrics, or must be provided by the design of the garment.

The gloves of the present invention may be used alone, as such to achieve the intended cut and abrasion resistance and electrical conductivity. In other circumstances, the knit gloves may be used as glove liners to be worn under other gloves, such as barriers to exposure to environmental hazards and the like, including gloves to prevent exposure to toxic chemicals, biological materials, radiation hazards, electric shock, heat or cold, and the like.

In the alternative, the present gloves may be worn over other gloves intended to provide like protection, in which circumstance, the gloves of the present invention serve to protect the inner glove as well as the wearer from cuts and abrasions.

It is also possible to laminate a protective barrier material to the fabric of the gloves, or to impregnate the gloves, in whole or in part, with a suitable barrier material. The gloves may be dip coated, for example, with a curable or thermoplastic elastomer formulation from a latex or solution coating bath, or from a polymer melt. In addition, the gloves may be impregnated with a thermoplastic or curable polymer, compounded with suitable ingredients, under heat and pressure, as by injection molding or the like. Some polymer coating may be applied by spray coating, roll coating, or a variety of other techniques. Such laminates or impregnants may contribute substantial additional protection from puncture by sharp implements, to an extent not afforded by knit fabrics per se, because of the nature of their construction.

In some circumstances, it is desirable to employ, in whole or in part, in the non-metallic fiber or yarn a material which will wick moisture and perspiration away from the hands. Natural or synthetic fibers may be employed for this purpose; cotton is generally preferred for its natural wicking abilities. Cotton blends, other cellulosic fibers, and hydrophyllic fibers may also be employed. Other hydrophobic materials may be sized or impregnated with wetting agents or other suitable materials to induce a capability for wicking.

When the gloves of the present invention are employed under other gloves, it will rarely be necessary to employ starch or talc to provide for ease of fitting, i.e., of sliding the glove onto the hand. The knit of the present gloves affords easy fitting of the gloves, and avoids the necessity for reliance on such materials which are often irritating and sensitizing to the wearer.

While the present invention has been discussed primarily with reference to protective garments, those of ordinary skill in the art will readily recognize that the yarns and fabrics produced in the present invention will have more general applicability, and may suitably and desirably be employed when the advantages of the particular properties and characteristics of the yarns and fabrics provided in the present invention will be of use.

It should be noted that the yarns have other properties and characteristics than the cut and abrasion resistance and the electrical conductivity discussed hereinabove. For example, such yarns have very high tensile strengths, and may be made with particular non-metallic constituents which afford high chemical resistance, heat resistance, and the like.

It is also possible to employ the yarns of the present invention in contexts in which the non-metallic fibers and yarns employed facilitate fabrication, but which are sacrificial components, removed by heat or chemical action at a later stage, leaving the metallic yarn core, in fabricated form, with no non-metallic component.

In still another aspect, the non-metallic fiber or yarn may be a thermoplastic or curable thermosetting polymer which is materially altered by the application of heat or treatment with or activation of curing systems to achieve products with very different properties than those of the composite yarns themselves.

EXAMPLE 1

A multi-filament metallic yarn (2) was made up of 91 ends of Type 304 Stainless fibers (3) having a diameter of 12 μm. The metallic yarn was substantially free of twist.

The metallic core yarn was served with two plies (4) and (5), in opposite orientation, of a 70 denier Nylon polyamide multi-filament yarn by wrapping on an elastic wrapping machine.

One kilogram of the composite yarn (1) had a length of 6,791 meters. The yarn had a tensile breaking strength of 5.56 pounds and an elongation at break of 1.20%.

The composite yarn was knit into a glove (10) on an industry standard knitting machine. The entire glove, including palm (12) and the finger stalls (14) and thumb stall (16), and except for the cuff potion (18), was formed of plain stitch, while the cuff was a ribbed knit. The knit fabric of the glove in the palm region (12) and in one of the finger stalls (14) is tested by the normal Betatec technique. The cut resistance is about 100 times or more higher than comparable knits of Kevlar® and Spectra® yarns without a stainless steel component in the yarn. The gloves also exhibit a cut resistance significantly greater than that of a commercially available glove marked as being made of the Kevlar®-Stainless wire composite yarn disclosed and claimed in U.S. Pat. No. 4,777,789 and U.S. Pat. No. 4,838,017, Kolmes, et al.

What is claimed is:

1. A fabric produced from a cut resistant, abrasion resistant, electrically conductive composite yarn for making protective garments comprising: a core and a serving wrapped on said core, wherein said core is a substantially torque-free continuous filament metallic yarn of at least about 60 ends, each fiber in said metallic yarn having a diameter of not more than about 25 μm, and said serving comprising at least one non-metallic fiber.

2. The fabric of claim 1 wherein said fabric is knit.

3. The fabric of claim 1 wherein said fabric is woven.

4. The fabric of claim 1 wherein said fabric is a non-woven felted fabric.

5. The fabric of claim 1 wherein said fabric is a bonded non-woven mat.

6. A cut resistant, abrasion resistant, electrically conductive protective garment formed of the fabric of claim 1.

7. A cut resistant, abrasion resistant, electrically conductive protective knit garment comprising the fabric of claim 2.

8. The cut resistant, abrasion resistant, electrically conductive protective knit garment of claim 7 having at least a portion thereof coated or impregnated with an elastomer.

9. The knit garment of claim 7 in the form of a glove.

10. The knit glove of claim 9 having at least a palm portion and the finger stall portions thereof coated or impregnated with an elastomer.

*11. A fabric produced from a cut resistant, abrasion resistant, electrically conductive composite yarn comprising:*

*a core and a serving wrapped on said core,*

*wherein said core is a substantially torque-free continuous filament metallic yarn of at least about 60 ends,*

*each fiber in said metallic yarn having a diameter of not more than about 25 μm, and*

*said serving comprising at least one non-metallic fiber.*

*12. The fabric of claim 11 wherein said fabric is knit.*

*13. The fabric of claim 11 wherein said fabric is woven.*

*14. The fabric of claim 11 wherein said fabric is a non-woven felted fabric.*

*15. The fabric of claim 11 wherein said fabric is a bonded non-woven mat.*

*16. The cut resistant, abrasion resistant, electrically conductive knit of claim 12 having at least a portion thereof coated or impregnated with an elastomer.*

*17. A fabric produced from a cut resistant, abrasion resistant, electrically conductive composite yarn for making protective fabrics comprising:*

*a core and a serving wrapped on said core,*

*wherein said core is a substantially torque-free continuous filament metallic yarn of at least about 60 ends,*

*each fiber in said metallic yarn having a diameter of not more than about 25 μm, and*

*said serving comprising at least one non-metallic fiber.*

* * * * *